May 12, 1970     K. P. PALMER     3,511,258

MEANS FOR PRODUCING PULSATING FLUID FLOW

Filed Sept. 11, 1968

INVENTOR
Kenneth Percival Palmer
BY Glascock, Downing
& Seebold
ATTORNEYS

Patented May 12, 1970

3,511,258
MEANS FOR PRODUCING PULSATING
FLUID FLOW
Kenneth Percival Palmer, Barford, England, assignor to Joseph Lucas (Industries) Limited, Birmingham, England
Filed Sept. 11, 1968, Ser. No. 758,986
Int. Cl. F15c 3/00
U.S. Cl. 137—81.5          5 Claims

ABSTRACT OF THE DISCLOSURE

Means for producing a pulsating flow of fluid in a passage comprises a mechanical oscillator device having an inlet and a pair of outlets, the inlet being perpendicular to the path of oscillation and the outlets being presented in opposite directions in said path, flow through at least one of the outlets causing interruption of flow in the passage to be controlled, and the inlet and outlets being connected by passages arranged at the inlet in V-formation so that oscillation of the device whilst fluid is supplied to the inlet from a stationary body causes alternate establishment of flow in the passages and thus in the outlets.

---

This invention relates to means for producing, in a passage, a pulsating flow of fluid, that is, one in which changes in pressure take place at predetermined intervals.

The object of the invention is to provide means for this purpose in a convenient form.

In accordance with the present invention means for producing a pulsating flow of fluid in a passage comprises a mechanical oscillator device having an inlet presented perpendicularly to the path of oscillation and a pair of outlets presented in the path of oscillation, in opposite directions respectively, at least one of the outlets being positioned so that when fluid is emitted therefrom, flow in said passage is inerrupted, but is re-established when flow from said outlet ceases, flow in the inlet controlling flow in the outlets through respective passages in the oscillator device, said passages, adjacent to the inlet, being in V-formatoin so that when flow through the inlet takes place from a stationary body, it will be established in one of said passages to permit flow through one of the outlets during movement of the device in one direction, and will be established in the other passage to permit flow to the other outlet during movement in the other direction.

Figure 1:
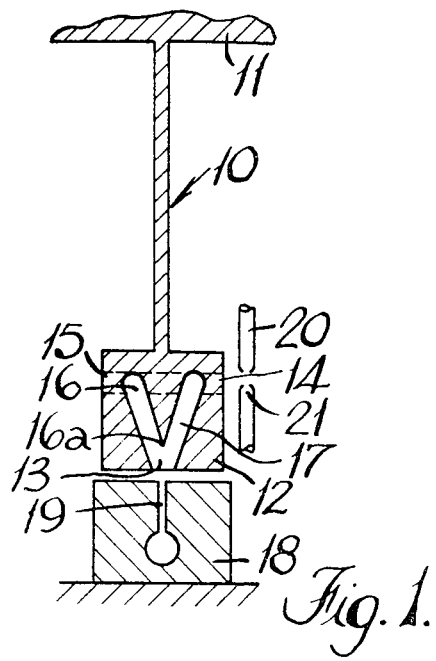
Figure 2:
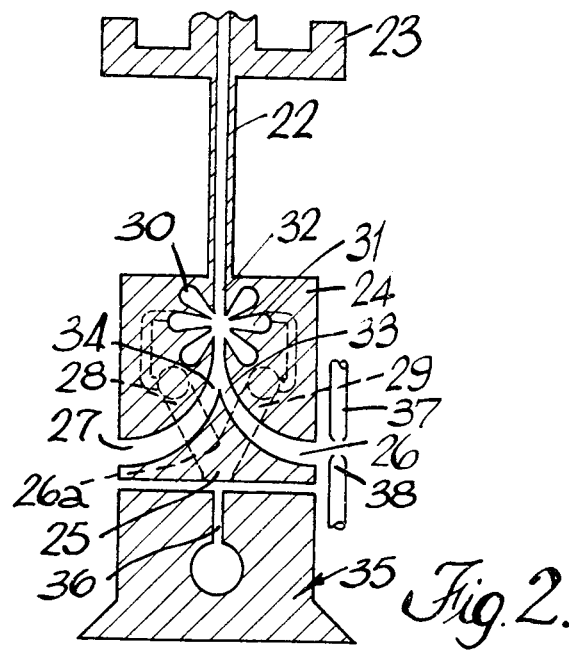

The invention will now be described by way of example with reference to the accompanying drawings in which:

FIG. 1 illustrates diagrammatically one form of apparatus constructed in accordance with the invention, and FIG. 2 illustrates an alternative form.

The example illustrated in FIG. 1 comprises a mechanical oscillator device comprising a resilient blade 10 secured at one end to a fixed body 11 and carrying at its free end a weight 12. The weight 12 has formed in it an inlet 13 presented perpendicularly to the path of oscillation, and a pair of outlets 14, 15 which are presented in the path of oscillation of the device in opposite directions respectively. The inlet 13 can communicate with the outlets 14, 15 through a pair of passages 16, 17 respectively arranged in V-formation. The passages 16, 17 converge towards the inlet 13 and their inner walls form a flow dividing edge 16a at the inlet 13. Moreover, the arrangement is such that the portion of the passage 16, adjacent to the inlet 13, extends in a direction away from the outlet 14 and the passage 17 is similarly disposed with respect to the outlet 15.

In a fixed body 18 is a passage 19, the outlet of which is arranged adjacent to and opposite the inlet 13 when the oscillator device is stationary. The passage 19 communicates, in use, with any suitable source of fluid pressure, such as an air compressor, from which the passage 19 receives a continuous supply of fluid.

Furthermore, adjacent to the outlet 14 of the weight 12 are a pair of nozzles 20, 21, the former communicating with a further continuous source of fluid under pressure, and the latter communicating with a device (not illustrated) in which pulsating fluid flow is to be produced. The gap between the nozzles 20, 21 is adjacent to the outlet 14 so that when fluid issues therefrom flow between these nozzles 20, 21 is interrupted.

When the weight 12 is at rest it is arranged with the inlet 13 off-set slightly from the axis of the passage 19, so that when pressure is applied in the passage 19 flow through the passage 17 in preference to the passage 16 will take place. Thus, as soon as pressure is applied in the passage 19 it will cause discharge from the outlet 15. A reaction will be set up tending to cause the weight 12 to move to the right as viewed in FIG. 1. The issuing jet of fluid causes this reaction to be created. The flow dividing edge 16a is so shaped that after the weight has moved to a predetermined extent to the right the flow from the passage 19 will be diverted suddenly from the passage 17 to the passage 16, thereby producing a reaction to cause the direction of movement of the weight to be reversed. The flow emitted from the outlet 14 will at the same time cause interruption of the flow from the nozzle 20 to the nozzle 21. As soon as the weight has moved sufficiently to the left as viewed in FIG. 1, the flow dividing edge 16a will cause the flow from the passage 19 to be directed to the passage 17, flow ceasing in the passage 16 and the cycle will be repeated.

With reference to the construction illustrated in FIG. 2, there is provided a hollow blade 22 secured at one end to a fixed structure 23, and the free end of this blade 22 carries a weight 24 in which is prcvided an inlet 25 presented perpendicularly to the path of oscillation, and a pair of outlets 26, 27 which are presented in the path of oscillation in opposite directions respectively, at opposite sides of the weight 24, in the manner of the outlets 14 and 15 of the construction in FIG. 1.

The inlet 25 does not, however, communicate directly with the outlets 26, 27, but communicates through passages 28, 29 arranged in V-formation with inlets 30, 31 of a fluid amplifier device formed within the weight. A flow dividing edge 26a is formed at the inlet ends of the passages 26, 27.

The fluid amplifier device has an inlet 32 communicating with the interior of the hollow blade 22, and there are outlet passages 33, 34 of the amplifier device, the latter communicating with the outlets 26, 27 respectively through curved passages. The interior of the hollow blade 22 communicates at its opposite end within the fixed structure 23, with a source of fluid under pressure, and as in FIG. 1, there is a fixed body 35 in which is formed a passage 36 communicating with a further source of fluid under pressure, and having an outlet which is arranged adjacent to the inlet 25 of the weight 24.

Arranged adjacent to the outlet 26 of the weight 24 are a pair of nozzles 37, 38 the former being connected to a further source of fluid under pressure, and the latter being in communication with a device at which pulsating fluid is intended to be produced.

The operation of this example is similar to that described with reference to FIG. 1 except that the pressure emitted from the outlets 26, 27 is derived from the passage 22 and can therefore be higher than that in the passage 19 in the body 18.

In either of the constructions illustrated there may be further nozzles similar to those indicated at 20, 21 or 37, 38 and arranged adjacent to the outlets 15 or 27 respectively, whereby pulsating fluid flow can be generated in two passages, the pulses alternating in the respective passages as the device oscillates.

Having thus described my invention what I claim as new and desire to secure by Letters Patent is:

1. Means for producing a pulsating flow of fluid in a passage comprising a mechanical oscillator device having an inlet presented perpendicularly to the path of oscillation and a pair of outlets presented in the path of oscillation, in opposite directions respectively, at least one of the outlets being positioned so that when fluid is emitted therefrom, flow in said passage is interrupted, but is reestablished when flow from said outlet ceases, flow in the inlet controlling flow in the outlets through respective passages in the oscillator device, said passages, adjacent to the inlet, being in V-formation so that when flow through the inlet takes place from a stationary body, it will be established in one of said passages to permit flow through one of the outlets during movement of the device in one direction, and will be established in the other passage to permit flow to the other outlet during movement in the other direction.

2. Means as claimed in claim 1 in which respective passages in the oscillator device are of generally L-shape and form direct communication between the inlet and the outlets respectively, their end portions adjacent to the inlet being of V-formation and their outlets being disposed at opposite sides of the device from the divergent ends of the V respectively.

3. Means as claimed in claim 1 in which the passages communicate with an amplifier device within the oscillator device, the amplifier device having a further inlet communicable with a source of fluid under pressure and a pair of outlets communicating with said outlets of the oscillator device respectively, the flow from the amplifier further inlet to said outlets being controlled by flow in the respective passages from the oscillator device inlet.

4. Means as claimed in claim 1 wherein the passage in which pulsating flow is to be created is disposed with a receiving nozzle aligned with a nozzle at the end of a passage which in use is in communication with a continuous source of fluid under pressure, the nozzles being arranged adjacent to one of the outlets of the oscillator device so that fluid emitted therefrom interrupts flow between said nozzles.

5. Means as claimed in claim 4 in which there are two further nozzles arranged adjacent to the other outlet so that flow therethrough interrupts flow between them.

References Cited

UNITED STATES PATENTS

| 3,228,602 | 1/1966 | Boothe | 132—815 XR |
| 3,275,015 | 9/1966 | Meier | 137—81.5 |
| 3,302,398 | 2/1967 | Taplin et al. | 137—81.5 XR |
| 3,410,290 | 11/1968 | Phillips | 137—81.5 |
| 3,454,025 | 7/1969 | Egli | 137—81.5 |

SAMUEL SCOTT, Primary Examiner